US010963351B2

(12) United States Patent
Mallela et al.

(10) Patent No.: US 10,963,351 B2
(45) Date of Patent: Mar. 30, 2021

(54) DATA STORAGE BACKUP SYSTEM

(71) Applicant: Seagate Technology LLC, Cupertino, CA (US)

(72) Inventors: Lalitha Kameswar Mallela, Hyderabad (IN); Sumanranjan Mitra, Mumbai (IN); AppaRao Puli, Khanapuram Haveli (IN); Siva Prakash Rajaram, Madurai (IN)

(73) Assignee: Seagate Technology LLC, Fremont, CA (US)

( * ) Notice: Subject to any disclaimer, the term of this patent is extended or adjusted under 35 U.S.C. 154(b) by 0 days.

(21) Appl. No.: 15/873,305

(22) Filed: Jan. 17, 2018

(65) Prior Publication Data

US 2019/0220365 A1      Jul. 18, 2019

(51) Int. Cl.
*G06F 12/00* (2006.01)
*G06F 11/14* (2006.01)
*G06F 3/06* (2006.01)

(52) U.S. Cl.
CPC ...... *G06F 11/1458* (2013.01); *G06F 11/1451* (2013.01); *G06F 3/0619* (2013.01)

(58) Field of Classification Search
CPC ............................ G06F 11/1458; G06F 3/0619
See application file for complete search history.

(56) References Cited

U.S. PATENT DOCUMENTS

| | | | |
|---|---|---|---|
| 5,961,761 A | 10/1999 | Heindel et al. | |
| 6,915,370 B2 | 7/2005 | Rankin et al. | |
| 7,162,560 B2* | 1/2007 | Taylor | G06F 1/24 710/260 |
| 7,590,737 B1 | 9/2009 | Chen et al. | |
| 8,526,422 B2 | 9/2013 | Hoover et al. | |
| 8,713,295 B2 | 4/2014 | Bax et al. | |
| 2006/0271736 A1* | 11/2006 | Zilavy | G06F 3/0605 711/115 |
| 2015/0269039 A1* | 9/2015 | Akirav | G06F 11/2007 714/4.11 |
| 2017/0090767 A1* | 3/2017 | Poston | G06F 3/065 |
| 2018/0293013 A1* | 10/2018 | Singh | G06F 3/0631 |
| 2019/0042583 A1* | 2/2019 | Tierney | G06F 16/10 |

* cited by examiner

*Primary Examiner* — Baboucarr Faal
(74) *Attorney, Agent, or Firm* — Hall Estill Attorneys at Law

(57) ABSTRACT

A data backup system can be implemented in a data storage enclosure that houses a backup controller. The backup controller may be connected to a storage media and a backup media via a switch. The backup media can be reassigned from an unavailable condition to an available condition by the backup controller in response to predicted degradation in the storage media. The backup media may be connected to a root complex of the backup controller via a backup partition and selection feature.

20 Claims, 6 Drawing Sheets

DATA STORAGE BACKUP SYSTEM

SUMMARY OF THE INVENTION

A data storage backup system, in accordance with some embodiments, has a data storage enclosure that houses a backup controller connected to a storage media and a backup media via a switch. The backup media is resassigned from an unavailable condition to an available condition by the backup controller in response to predicted degradation in the storage media. The backup media is connected to a root complex of the backup controller via a backup partition and selection feature.

Various embodiments of a data storage backup system consist of a host connected to a data storage enclosure that houses a backup controller connected to a storage media and a backup media via a switch. The backup media is set as unavailable in response to the backup controller predicting nominal operation of the storage media. Data is subsequently stored in the storage media from the host through the switch. Prediction of degradation in the storage media with the backup controller establishes a backup partition in the switch as directed by the backup controller to provide a backup signal route from the storage media to the backup media through the backup controller. The backup signal route is utilized copy data from the storage media to the backup media.

In other embodiments, a data storage backup system has a host connected to a data storage enclosure that houses a backup controller connected to a storage media and a backup media via a switch. The backup media is set as unavailable in response to the backup controller predicting nominal operation of the storage media. Data is subsequently stored in the storage media from the host through the switch. Prediction of degradation in the storage media with the backup controller causes a backup signal route from the storage media to the first backup media through the backup controller to be employed with the backup signal route provided by a backup partition of the switch. Data is copied from the storage media to the first backup media and the first backup media is then assigned to a port address of the storage media with the backup controller.

DETAILED DESCRIPTION

The present disclosure is generally directed to a data storage system with optimized data backup that maintains system performance despite errors and/or failures to one or more data storage devices of the system.

The advent of non-volatile solid-state memory has allowed data storage systems to evolve and provide practical data capacities with relatively fast data access capabilities. However, some solid-state memories suffer from degradation with use that can be unpredictable. Such degradation can jeopardize the data stored in the solid-state memory as well as system data access performance. Hence, various embodiments configure a data storage backup system that mitigates the reliability and performance impact of solid-state memory degradation.

Figure 1:
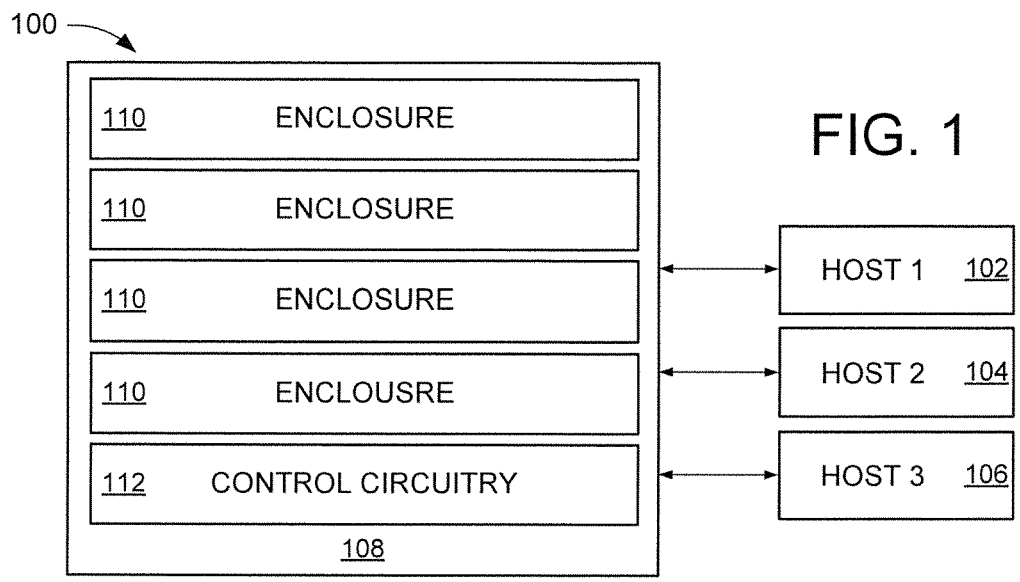
FIG. 1 is a block representation of an example data storage system arranged in accordance with various embodiments.

FIG. 1 is a block representation of an example data storage system 100 in which various embodiments of the present disclosure may be practiced. The data storage system 100 may consist of any number of remote hosts 102, 104, and 106 independently connected to one or more storage nodes 108 via a wired and/or wireless network. A storage node 108 is not limited to a particular configuration, but can be a rack that houses one or more data storage enclosures 110 that operate independently, and concurrently, to service data access requests from the respective hosts 102/104/106.

The storage node 108 may additionally have local control circuitry 112, which may be a server, router, switch, or other data dispensing component. The control circuitry 112 can direct data storage, data retrieval, and data maintenance operations from the respective enclosures 110 to allow assorted computing capabilities, such as cloud computing, virtual machines, and remote data backup. Such data operations may be conducted by the control circuitry 112 alone, or in conjunction with operating circuitry local to the various enclosures 110.

Figure 2:
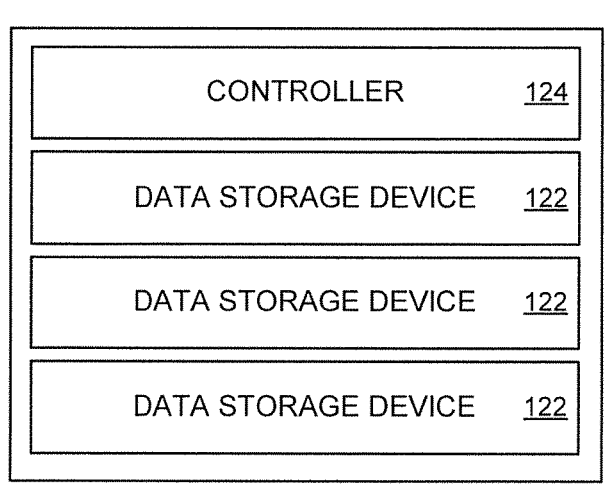
FIG. 2 displays a block representation of an example enclosure that may be employed in the data storage system of FIG. 1.

FIG. 2 conveys a block representation of an example data storage enclosure 120 that may be utilized in the data storage system 100 of FIG. 1. The enclosure 120 may be a single housing in which a plurality of separate data storage devices 122 are positioned. For instance, multiple data storage devices 122 can each be physically and electrically connected to an enclosure controller 124 within a common housing.

It is contemplated that the respective data storage devices 122 can be operated, physically removed, physically installed, electrically activated, and electrically deactivated individually, or collectively, by the local controller 124. The enclosure 120 may be arranged to have stand-alone support systems, such as power source and cooling means, which aid in consistent performance of the respective data storage devices 122.

Figure 3:
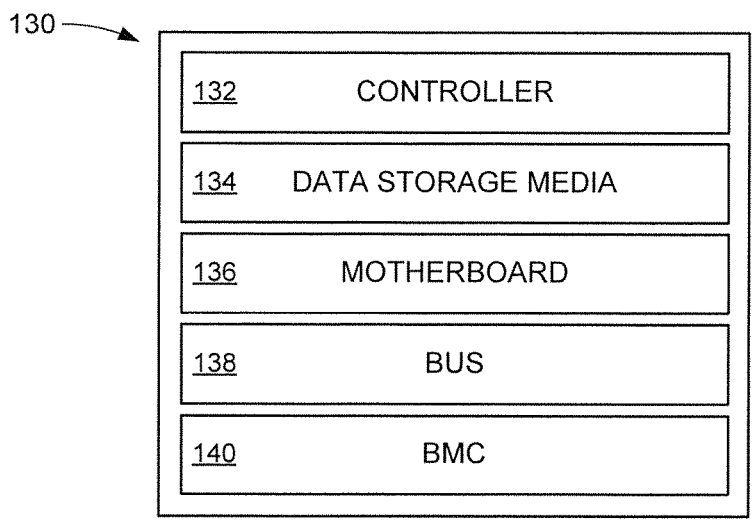
FIG. 3 shows a block representation of an example data storage device that can be incorporated into the enclosure and system of FIGS. 1 & 2.

The block representation of FIG. 3 illustrates an example data storage device 130 that can be incorporated into the data storage system 100 of FIG. 1 individually and/or as part of a data storage enclosure 120. It is noted that a data storage device 130 can be constructed with any amount of data capacity, data access speed, and usable lifespan, without limitation. However, various embodiments configure the data storage device 130 with a local controller 132, such as a microprocessor or programmable circuit, that can direct data access operations to and from local storage media 134.

Although not required or limiting, the storage media 134 can be a non-volatile solid-state memory, such as NAND flash memory, resistive random access memory, spin-torque random access memory, phase change random access memory, Xpoint memory, or other stable and accessible memory structure. The storage media 134 can be physically attached and/or electrically connected to a motherboard 136 via a bus, port, channel, or other interconnection. The motherboard 136 may further support at least one bus 138 dedicated to interconnecting various hosts, such as host 102 of FIG. 1, controller 124 of FIG. 2, or local controller 132 of FIG. 3, to the storage media 134 and a board management controller (BMC) 140 resident on the motherboard 136.

Through the various components of the data storage device 130, one or more data pathways can enable efficient data storage and retrieval from one, or many, storage media 134. In yet, non-volatile memories can degrade through use and become unreliable. If media 134 degradation was consistent or reliable from memory array to memory array, the local controllers 132/140 could reactively and proactively move data between media 134 to avoid a decrease in data access performance for the device 130.

However, separate media 134 do not exhibit consistent or reliable wear, which results in varying error and failure rates for different media 134, and data storage devices 130, within an enclosure. As such, it is difficult to reliably predict when and how media 134 will degrade and/or fail. Accordingly, various embodiments provide a backup system for a data storage device/enclosure that can efficiently react to detected media 134 degradation by moving data to a more reliable media 134 without disturbing or degrading data access performance of the data storage device and enclosure.

Figure 4:
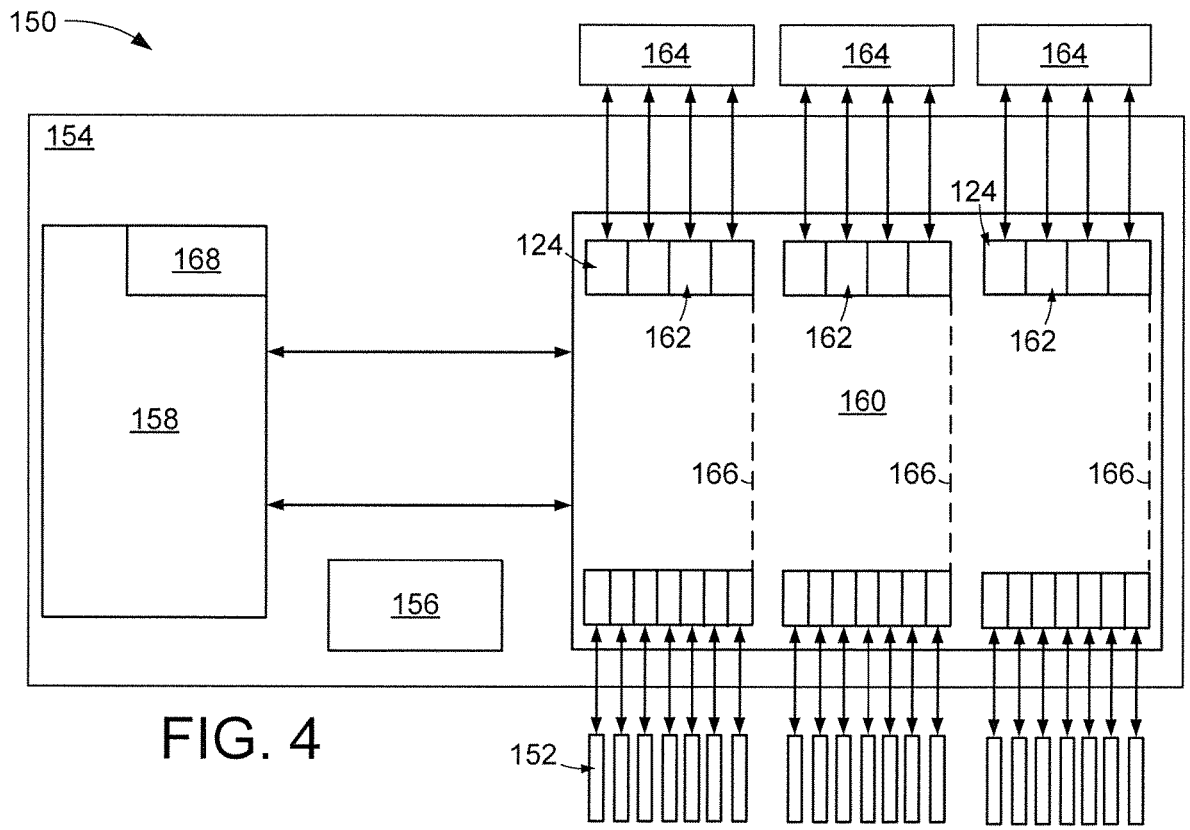
FIG. 4 conveys portions of an example data storage system constructed and operated in accordance with assorted embodiments.

FIG. 4 displays a line representation of portions of an example data storage enclosure 150 in which a plurality of non-volatile solid-state media 152 are housed, connected, and utilized in accordance with assorted embodiments. The enclosure 150 has at least one motherboard 154 onto which a controller 156, backup controller 158, and enclosure switch 160 are mounted. The local controller 156 may operate independently, and concurrently, with the backup controller 158 to direct data access and maintenance operations to, and from, the assorted media 152 connected to the switch 160 via a plurality of ports 162.

The backup controller 158 can comprise circuitry that monitors data storage activity in the local media 152 and determines when, and how, data is to be backed up by being stored on additional, different media 152. The backup controller 158 may also direct data maintenance operations where data is moved between different media 152 of the enclosure 150. It is contemplated, but not required, that the backup controller 158 communicates with the switch 160 via a peripheral component interconnect express (PCIe) serial interface that employs a transfer protocol, such as non-volatile memory express (NVMe) or advanced host controller interface (AHCI).

As shown, the switch 160 can be virtually partitioned by the local controller 156 and/or backup controller 158 to direct connections between the ports 162 occupied by various remote hosts 164 to ports 162 occupied by the assorted local media 152. The virtual partitions 166 can be customized over time to allow one or more concurrent data streams to/from the hosts 164 to/from the media 152.

While the virtual partitions 166 and use of PCIe connections can provide low data access latencies, the various media 152 can degrade over time and increase the risk of data access errors. For instance, when a write tolerance for a solid-state data storage destination 152 is reached, there is a chance the media 152 may not respond to reads and/or might be dead after a power cycle, which results in the data stored in the media 152 being lost. Hence, efficient and fast operation of the backup controller 158 to detect at-risk media 152 and conduct data backup is emphasized in enclosures 150 employing solid-state media 152, such as NAND flash solid-state devices (SSD).

In the event of a media failure, device replacement may be scheduled, but such activity correlates with a host 164 reboot for enumeration of the new media 152. Moving data to any newly installed media 152 can involve a root complex 168 of the backup controller 158, which induces a reboot of at least one host 164 reboot for enumeration of the newly media 152. Such host 164 rebooting and enumeration of newly installed media 152 can involve large amounts of system overhead, such as processing and cache capabilities, that inhibit the fulfillment of data access requests by the assorted hosts 164 to the various media 152.

It is contemplated that a distributed data storage system may utilize a separate enclosure 150 for data backup. However, the cost and complexity of having a separate backup enclosure 150 can be prohibitive to wide-scale industry adoption, particularly in small to mid-range data consumers that require less than an entire enclosure 150 worth of backup capacity. Thus, replacing failed/failing media 152 in a single storage enclosure 150 involves a lengthy host reboot and providing a separate backup enclosure 150 is costly and adds system complexity. Accordingly, various embodiments are directed to a data storage enclosure 150 that intelligently and efficiently allows backup media 152 to be utilized without host rebooting.

Figure 5A:
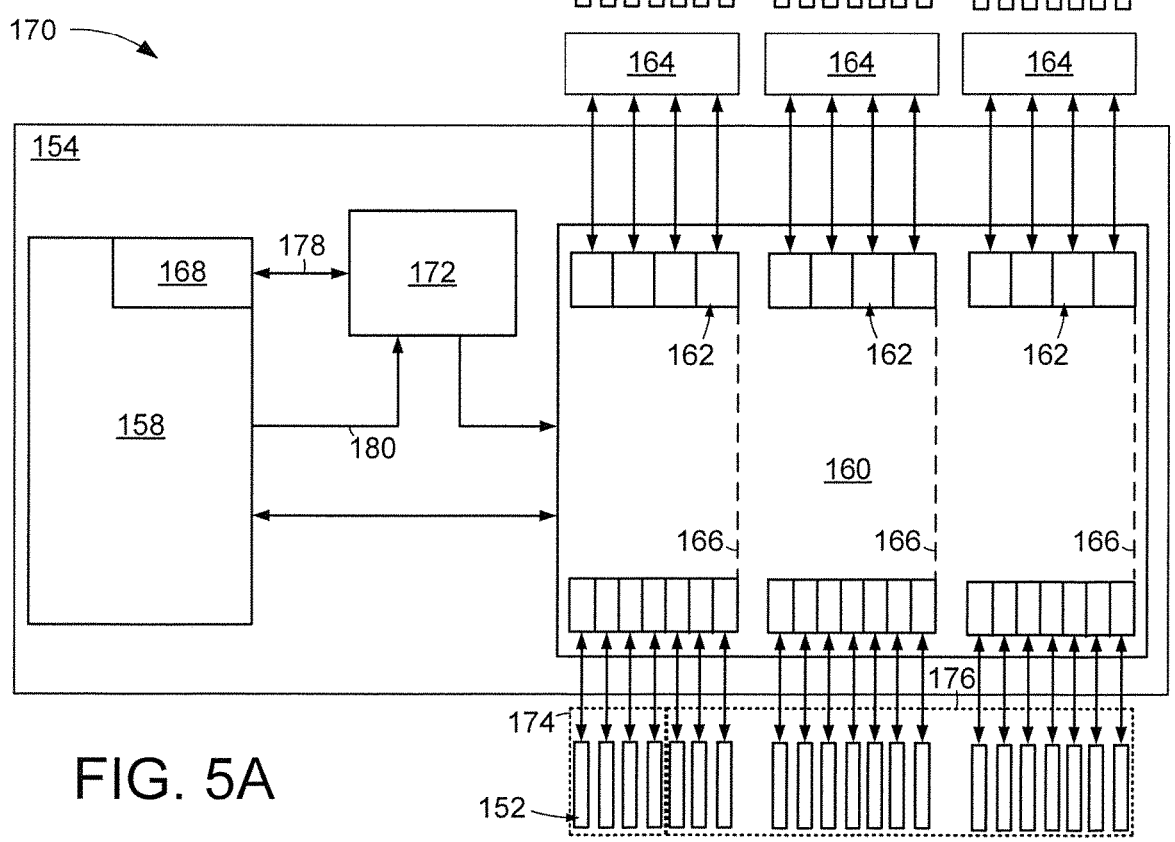
FIGS. 5A-5C respectively illustrate portions of an example data storage system arranged in accordance with various embodiments.
Figure 5B:
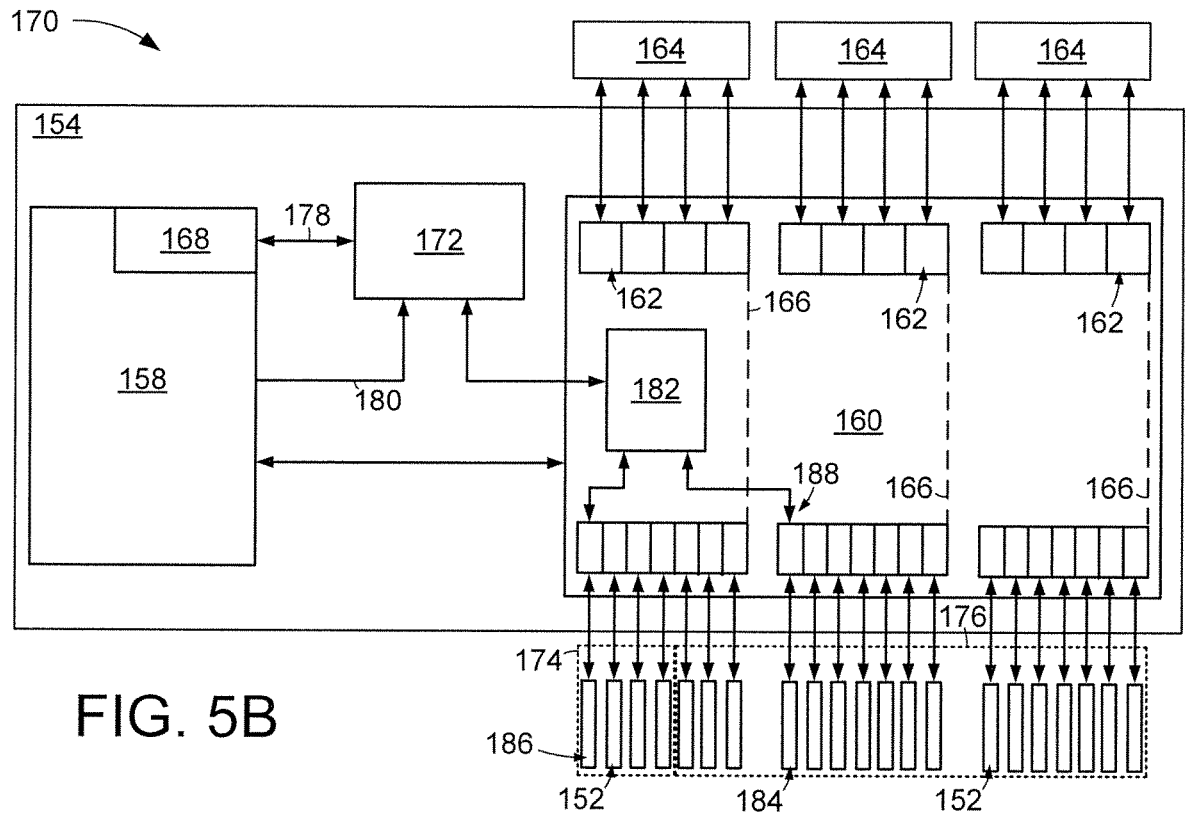
Figure 5C:
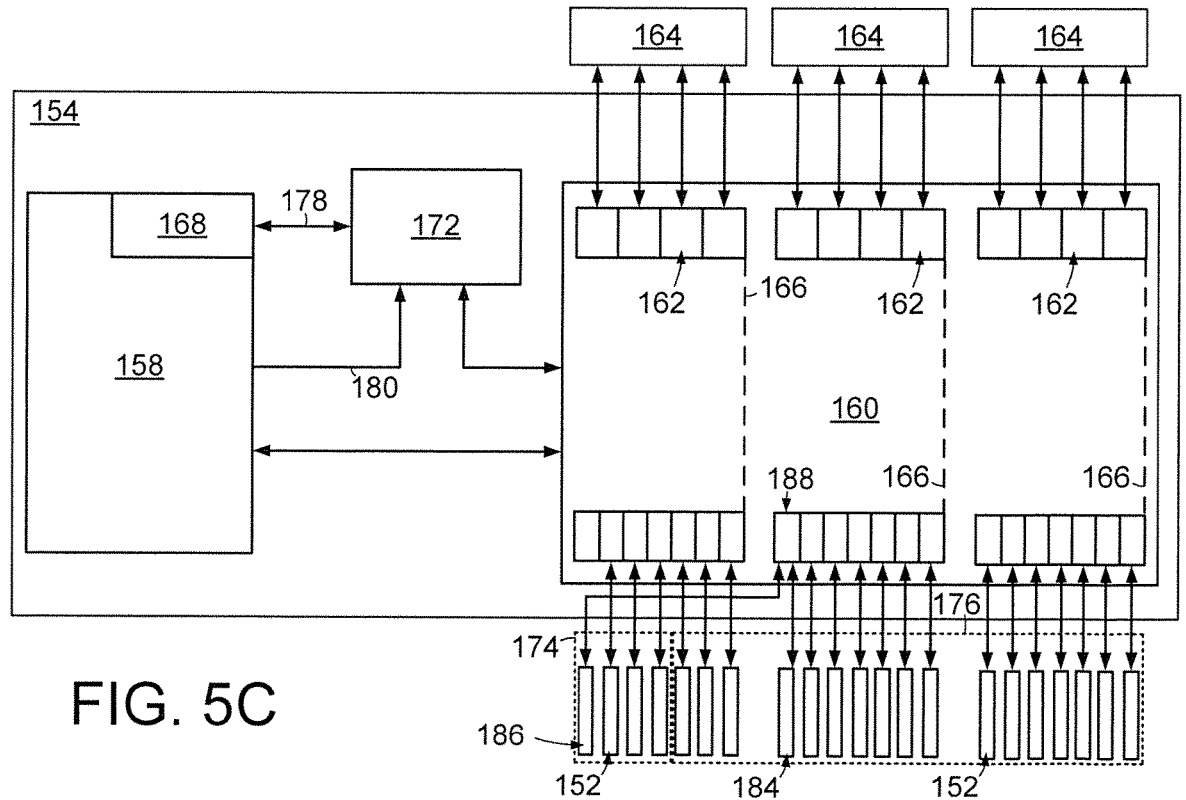

FIGS. 5A-5C respectively represent portions of an example data storage enclosure 170 that is configured in accordance with various embodiments. The enclosure 170 positions a selection feature 172 between the switch 160 and the backup controller 158. The selection feature 172 may comprise circuitry that allows for the activation of one, or more, ports 162. A plurality of separate data storage media 152 are reserved as a backup pool 174 by the local controller 156 and backup controller 158 to be unused for data storage until media 152 of the storage pool 176 degrade and/or fail.

FIG. 5A conveys how the selection feature 172 can have a link 178 to the root complex 168 of the backup controller 158 along with a selection input 180 from the backup controller 158. When the link 178 is disabled, the media 152 of the reserved backup pool 174 are maintained in an inactive state where the capacity of the respective media 152 are not accessible by the local controller 156 or backup controller 158.

FIG. 5B illustrates how activation of the link 178, such as with a selection signal via input 180, the selection feature 172 establishes a virtual backup partition 182 in the switch 160 that establishes a backup route from a failing device 184 to a backup media 186. The backup route can be connected to a host 164 and port 162 via the link 178 to the root complex 168, which provides protocol support to allow the data of the failing device 184 to be cloned to the backup media 186. Thus, the backup route passes between media 152 through the root complex 168 and host port 162 as established by the backup partition 182.

In FIG. 5C, cloning of data from the failing device 184 has been completed and the downstream port 188 from the failing device 184 is directed to the backup media 186 by the local 156 and backup 158 controllers. By keeping the originally set port address despite a failed device and completed copying of data, the existing virtual partitions 166 can be maintained to associate the various hosts 164 with the assorted media 152 of the storage pool 176. It is noted that the failed device 184, a replacement device, or no device at all may be physically connected to the downstream port 188 while the backup media 186 is virtually linked to the downstream port 188.

The utilization of reserved backup media 186 at the disk level, as opposed to a remote, separate data storage enclosure, provides efficient utilization of PCIe interconnections of the switch 160, link 178, and BMC 158 to quickly and accurately offload data from a failing device 184. The incorporation of the selection feature 172 allows the BMC 158 and switch 160 to be unaltered and available to be leveraged for data access and maintenance operations at the discretion of the local 156 and backup 158 controllers.

Such implementation of device backup results in a seamless attachment of new storage devices that does not require a host 164 reboot. That is, the use of the selection feature 172 removes the host 164 from the backup operations and the port 162 address of the data remains the same with no added latency due to the physical connection of the backup media 186 to the same switch 160 within a common enclosure 170. Once the selection feature 172 is disabled after device backup, as shown in FIG. 5C, the host 164 can access data without undergoing a power cycle due to the media 184 already be enumerated into the switch 160.

The ability to selectively create a virtual backup partition 182 with the selection feature 172 and BMC 158 provides flexibility to configure the switch 160 in whatever manner that optimizes current data storage and data access requests. However, the selection feature 172 can add complexity to the motherboard 154 and enclosure 170. Therefore, some embodiments create a permanent backup partition in the switch 160 that reduces the complexity of the selection feature 172.

Figure 6A:
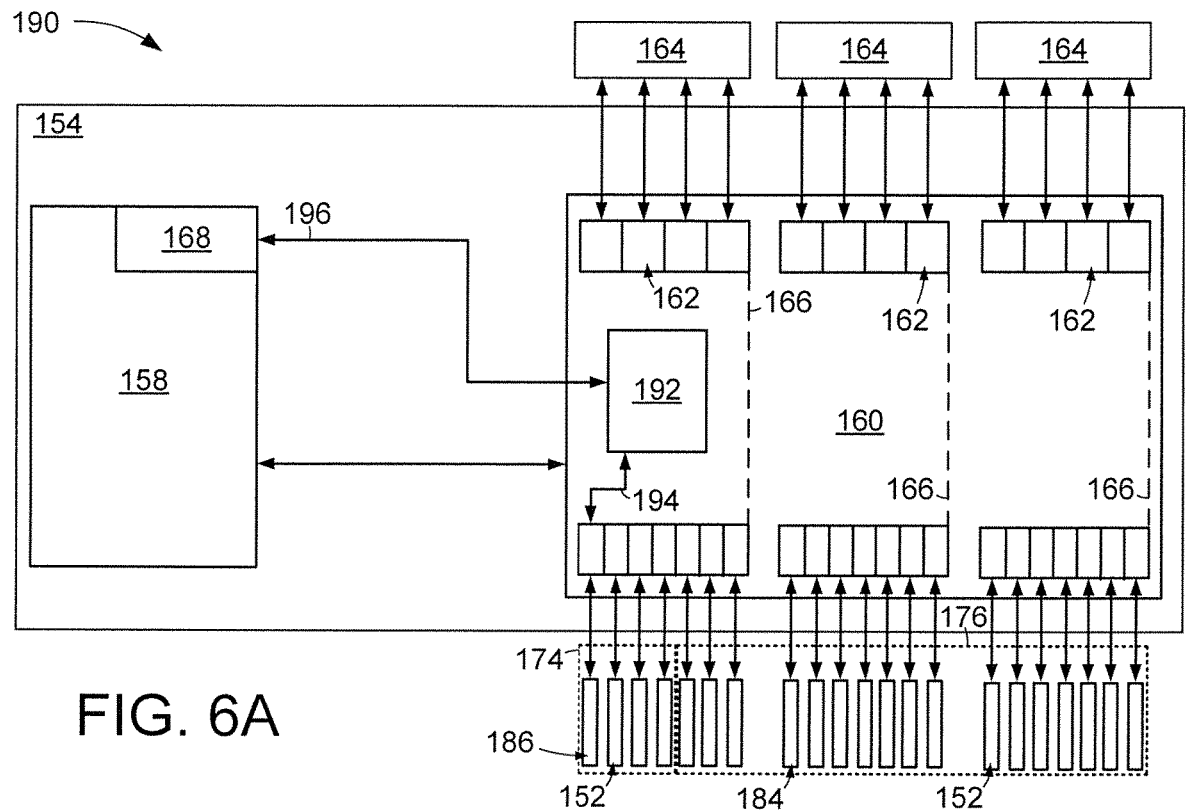
FIGS. 6A-6C respectively depict portions of an example data storage system configured in accordance with some embodiments.
Figure 6B:
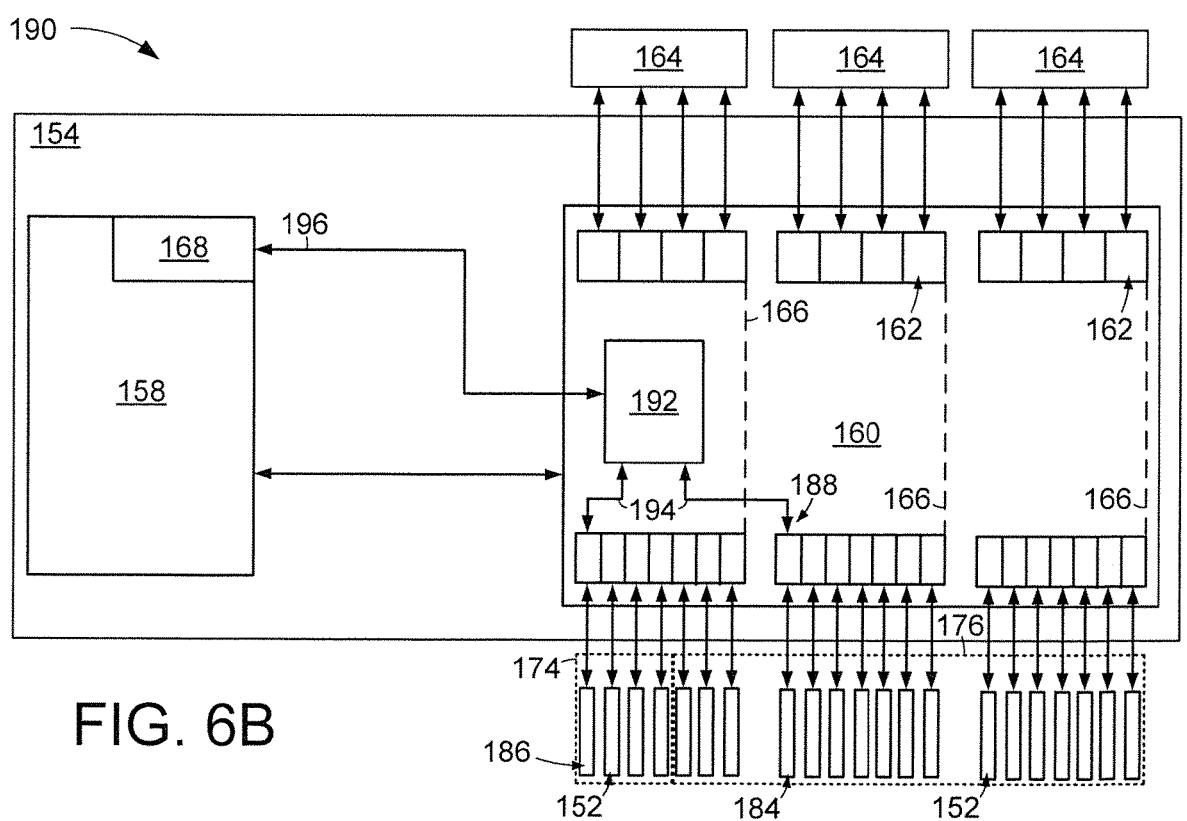
Figure 6C:
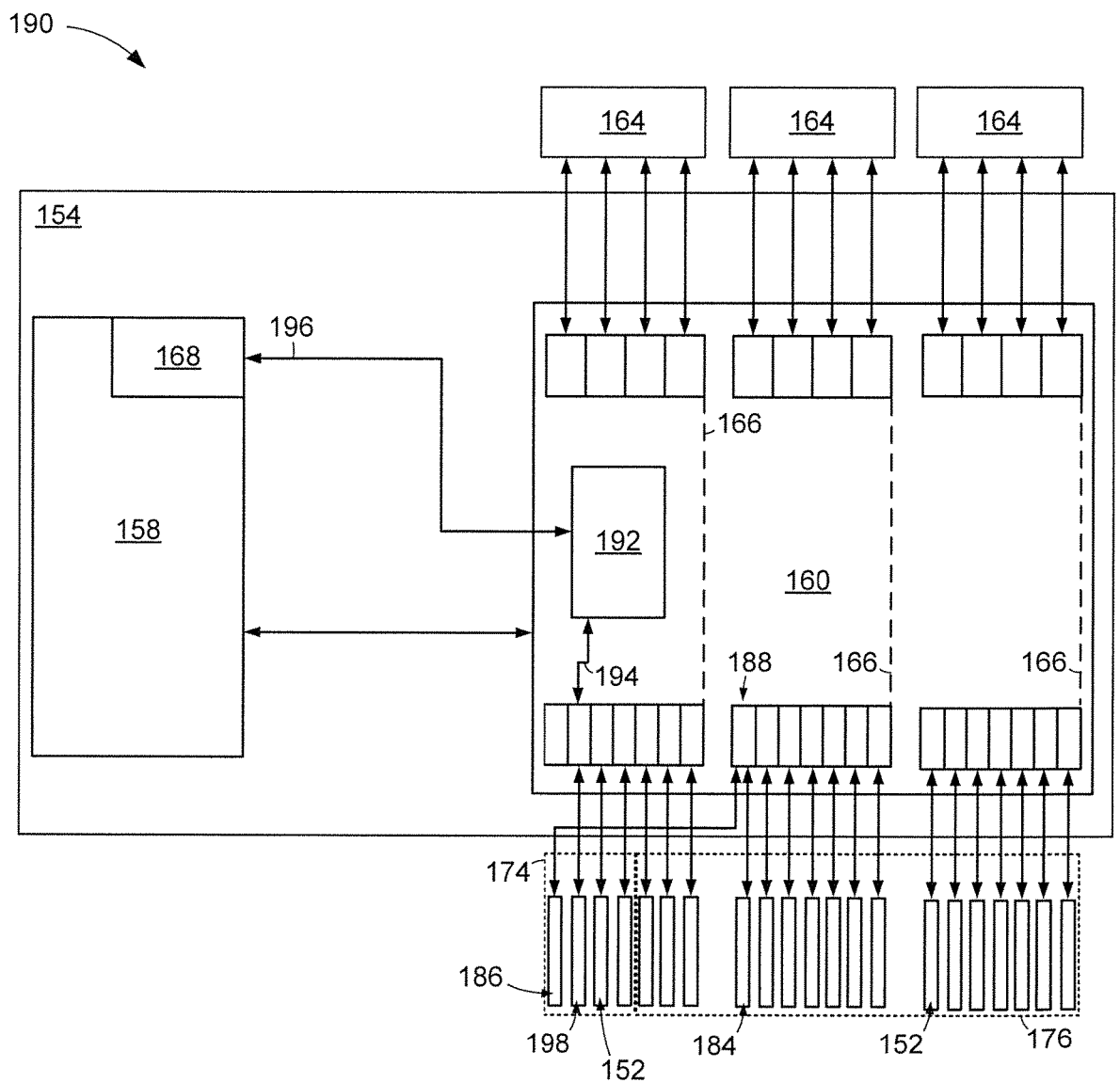

FIGS. 6A-6C respectively display portions of an example enclosure 190 that employs a permanent virtual backup partition 192 in lieu of selection circuitry external to the BMC 158. FIG. 6A depicts how a backup partition 192 is positioned in the switch 160 to provide a backup route 194 through the root complex 168. The backup route 194 can comprise a backup link 196 that may be a PCIe connection to the BMC 158 in order to provide protocol support for any of the backup media 186 of the reserved backup pool 174.

The backup route 194 and backup partition 192 can interconnect multiple media, as shown in FIG. 6B, which allows data to be cloned, moved, and/or duplicated from one or more media 152 of the storage pool 176. Once data is proactively, or reactively, moved to the backup media 186, the backup media 186 is set to the downstream port 188 of the storage pool 176 where the data originally was stored. Meanwhile, the BMC 158 moves the backup route 194 to a different backup media 198, as shown in FIG. 6C. In this way, the backup partition 192 will continually have an available backup media 186 ready to receive data from the storage pool 176.

Figure 7:
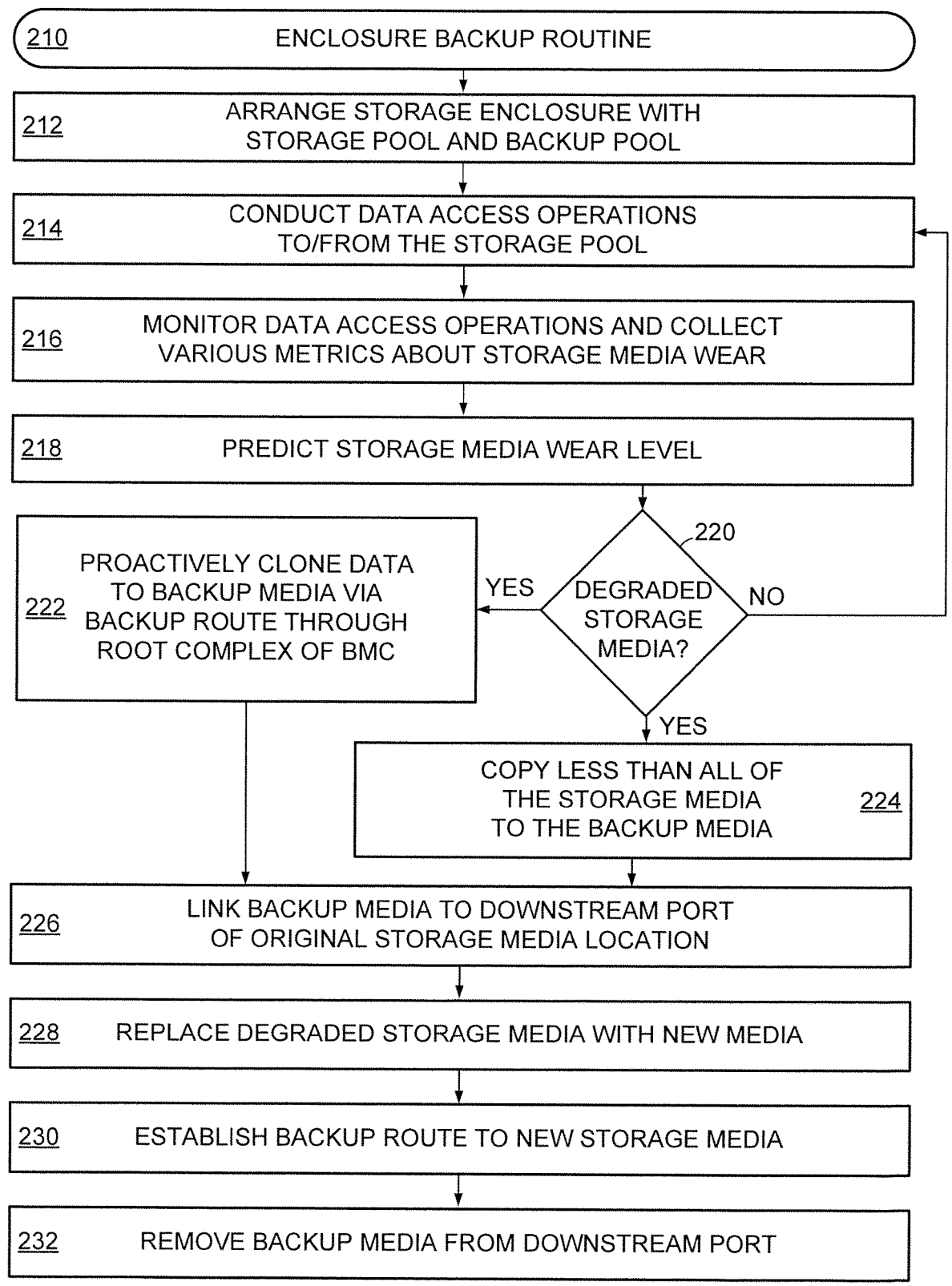
FIG. 7 provides a flowchart of an example enclosure backup routine that can be carried out by the data storage systems of FIGS. 1-6C.

FIG. 7 is a flowchart of an example enclosure backup routine 210 that can be carried out by the assorted embodiments of FIGS. 1-6C. The routine 210 begins with step 212 arranging a data storage enclosure that houses a storage pool of data storage media and a backup pool of reserved data storage media within a common housing. The respective pools are each physically connected to a common switch of an enclosure motherboard that also supports a local controller and backup controller.

Step 214 conducts various data access operations to, from, and on the media of the storage pool while the media of the backup pool are available and in working order, but are not utilized for data storage. It is noted that step 214 may set the various backup media as unavailable while the storage media of the storage pool are detected, or predicted, to be operation nominally without wear above a determined wear threshold. The data access operations are monitored in step 216 by at least a local controller to collect various operating metrics of the respective media of the storage pool. Such metrics may involve power consumption, access counts, access frequencies, and environmental factors, like heat and humidity, to predict a wear level in step 218 for each data storage media of the storage pool.

Once a threshold wear level established by the enclosure backup controller is reached, decision 220 determines how to handle the worn data storage media. Decision 220 can trigger the proactive cloning of some, or all, of the data to media of the backup pool in step 222. The cloning of data in step 222 can begin by setting at least one backup media as available and the degraded storage media as unavailable before utilizing the PCIe capability of the BMC, which acts as a root complex within the enclosure, to initiate and carry out the copying of data to the backup media via a backup route.

Alternatively, decision 220 can select to move data deemed by the backup controller to be frequently updated (hot) data to the backup media in step 224 while keeping less frequently updated (cold) data resident in the original media of the storage pool. The ability to select varying levels of data backup allows the BMC to optimize the backup operations with regard to other pending data access requests from hosts connected to the enclosure.

The operations of steps 222 and 224 can utilize either a temporary backup partition engaged by a separate selection feature, as in FIGS. 5A-5C, or a permanent backup partition with selection circuitry incorporated into the backup controller, as in FIGS. 6A-6C. The utilization of a backup media proceeds to step 226 where the backup media is linked by the backup controller to the downstream port in the storage pool where the data was previously stored. As a result, the data resident in the backup media is immediately available for access from any host without rebooting the host or conducting a power cycle of any host, backup controller, or local enclosure controller.

With the backup media taking the place of media of the storage pool, data read requests are satisfied by the backup media linked to the downstream port of the storage pool. Step 228 then replaces the media of the storage pool by physically engaging the downstream port, which may be a universal serial port or other physical bus structure. The availability of the new media in the storage pool allows the backup controller to clone the backup media to the new media of the storage pool in step 230 by establishing a backup route through the root complex of the backup controller via a temporary, or permanent, backup partition. In other words, step 230 can establish a backup route that copies data from the backup pool to the storage pool.

At the conclusion of step 230, the backup media is removed from the downstream port of the storage pool in step 232 to allow the new storage media to take over data access operations, again without host or controller rebooting or power cycling. The various aspects of routine 210 are not required, or limiting. As such, any aspect can be changed, removed, or replaced without deterring from the spirit of the present disclosure. For example, steps and/or decisions can be added for the activation and utilization of a selection feature to establish a temporary virtual backup partition in the switch that allows a root complex to be incorporated into a backup route.

Through the various embodiments of the present disclosure, a data storage enclosure can enjoy seamless data backup that does not require a host reboot or power cycle to enumerate a newly installed device. The ability to autonomously backup data from a failing data media and allow for media replacement without having to reboot the data storage enclosure provides continuous data access despite employing a media that degrades with normal use. The ability to use unaltered backup controller and PCIe switch in the various embodiments allows a data storage enclosure to be retrofitted to implement seamless data backup.

In some embodiments, a multiplexer is introduced at a selected port, to select between a host path to a data media of an enclosure or a root complex path through a backup controller. The backup controller can then save an existing configuration and re-configure virtual partitions of a PCIe switch to create a virtual backup partition with the backup controller as a root complex for downstream data port(s). A port can be linked to a backup media destination from a media identified as degraded in order to allow data to efficiently be moved and/or cloned.

The root complex of a backup controller can re-enumerate a data media and initiate a data clone involving PCIe peer-to-peer transactions within the enclosure. Once a data backup/clone operation has been completed, the backup controller can unbind the destination backup media, which contains actual data, and bind back to the parent partition of the original data storage location. Next, the multiplexer can be disabled to trigger deletion of backup partitions and tag the failed media for future replacement.

An alternative approach positions a permanent virtual backup partition in the PCIe switch to connect the backup controller with the downstream data ports. Once a degraded media arises, the media is unbound from its parent partition and bound to media of the backup pool to allow for data to flow to the backup destination. Completion of data backup causes the backup controller to unbind both the degraded and backup media from the backup pool before linking the backup media to the original port and parent partition and attaching a new backup media to the backup partition.

What is claimed is:

1. An apparatus comprising a data storage enclosure housing a backup controller connected to a storage media and a backup media via a switch, the backup media reassigned from an unavailable condition to an available condition via a virtual backup partition temporarily established in the switch by the backup controller in response to predicted degradation in the storage media without conducting a power cycle of the backup controller, the backup media maintaining an original port address of the storage media, the backup media connected to a root complex of the backup controller via a backup partition and selection feature.

2. The apparatus of claim 1, wherein the switch is a peripheral component interconnect express interconnection of the backup controller to the backup media and storage media.

3. The apparatus of claim 2, wherein the switch connects a plurality of different hosts to the backup controller and storage media.

4. The apparatus of claim 2, wherein the switch comprises a plurality of different virtual partitions.

5. The apparatus of claim 1, wherein the backup media is assigned to the virtual backup partition of the storage media in the available condition.

6. The apparatus of claim 1, wherein the backup media contains data cloned from the storage media.

7. The apparatus of claim 1, wherein the storage media and backup media each comprise NAND solid-state memory.

8. The apparatus of claim 1, wherein the backup media and storage media are each physically connected to a common bus.

9. A method comprising:
connecting a host to a data storage enclosure, the data storage enclosure housing a backup controller connected to a storage media and a backup media via a switch;
setting the backup media as unavailable in response to the backup controller predicting nominal operation of the storage media;
storing data in the storage media from the host through the switch, the storage media having a port address;
predicting degradation in the storage media with the backup controller;
establishing a temporary virtual backup partition in the switch as directed by the backup controller without conducting a power cycle of the backup controller and the host, the backup partition providing a backup signal route from the storage media to the backup media through the backup controller, the backup media accessed via the port address; and
copying data from the storage media to the backup media.

10. The method of claim 9, wherein the backup controller links the backup media to a port address of the storage media after copying data.

11. The method of claim 10, wherein the storage media is physically disconnected from the switch after the backup media is linked.

12. The method of claim 9, wherein the temporary virtual backup partition is generated in response to a selection feature being activated by the backup controller, the selection feature being physically separate from the backup controller and switch.

13. The method of claim 12, wherein the selection feature is a multiplexer having a selection input from the backup controller, a first output to a root complex of the backup controller, and a second output to the switch.

14. The method of claim 9, wherein the backup media is virtually separated from the storage media by a partition of the switch.

15. A method comprising:
connecting a host to a data storage enclosure, the data storage enclosure housing a backup controller connected to a storage media, first backup media, and a second backup media via a switch;
setting the first backup media and second backup media each as unavailable in response to the backup controller predicting nominal operation of the storage media;
storing data in the storage media from the host through the switch to a port address of the storage media;
predicting degradation in the storage media with the backup controller;
employing a backup signal route from the storage media to the first backup media through the backup controller via a virtual backup partition established in the switch without conducting a power cycle of the backup controller, the backup signal route provided by a backup partition of the switch;
copying data from the storage media to the first backup media; and
assigning the first backup media to port address of the storage media with the backup controller.

16. The method of claim 15, wherein the virtual backup partition is permanently positioned in the switch.

17. The method of claim 15, wherein the backup controller re-enumerates the first backup media without conducting a rebooting the host operation.

18. The method of claim 15, wherein the second backup media is connected to the virtual backup partition in response to the first backup media being assigned to the port address of the storage media.

19. The method of claim 15, wherein a read request for the data is satisfied by reading data from the first backup media.

20. The method of claim 18, wherein the read request is satisfied during a single, continuous power cycle of the host.

\* \* \* \* \*